(12) United States Patent
Feeley

(10) Patent No.: US 6,242,026 B1
(45) Date of Patent: Jun. 5, 2001

(54) ILLUSTRATION APPLICATOR FOR FOOD PRODUCTS

(76) Inventor: Edward Joseph Feeley, 34 Frost Rd., Wappingers Falls, NY (US) 12590

( * ) Notice: Subject to any disclaimer, the term of this patent is extended or adjusted under 35 U.S.C. 154(b) by 0 days.

(21) Appl. No.: 09/391,888

(22) Filed: Sep. 7, 1999

(51) Int. Cl.[7] ..................................................... A23P 1/00
(52) U.S. Cl. ........................... 426/383; 426/87; 426/104; 99/450.1
(58) Field of Search ..................................... 426/383, 104, 426/87, 289, 94, 249, 290, 292, 296; 99/450.1, 450.2, 494; 118/301; 219/214

(56) References Cited

U.S. PATENT DOCUMENTS

| | | | |
|---|---|---|---|
| 2,952,225 | * | 9/1960 | Ellison .................................... 101/4 |
| 4,112,834 | * | 9/1978 | Thiry ................................... 99/450.1 |
| 4,125,658 | * | 11/1978 | Miles ................................... 428/131 |
| 4,285,978 | * | 8/1981 | Quinlivan ............................... 426/87 |
| 4,531,292 | * | 7/1985 | Pasternak ............................ 33/18 R |
| 4,605,579 | * | 8/1986 | Armeno et al. ......................... 428/66 |
| 4,946,696 | * | 8/1990 | Nendl et al. .......................... 426/383 |
| 4,997,670 | * | 3/1991 | Kielsmeier et al. .................. 426/582 |
| 5,017,394 | * | 5/1991 | Macpherson et al. ............... 426/302 |
| 5,315,922 | * | 5/1994 | Keller ..................................... 99/447 |
| 5,678,476 | * | 10/1997 | Sanders ............................... 99/450.1 |
| 5,789,009 | * | 8/1998 | Kordic et al. ........................ 426/391 |

\* cited by examiner

Primary Examiner—Gabrielle Brouillette
Assistant Examiner—Sherry A. Daverman

(57) ABSTRACT

A method of creating food product, such as pizza, which will produce an illustrated, decorative personalized food product by using edible symbols and or edible granules and or edible powder. The edible symbols, granules or powder, which may have coloring, are applied to the surface of food product by using a symbol placement applicator that applies precut symbols and or a stencil placement applicator, which applies granulated or powdered edibles to form designs. The symbols and or granulated or powder design is fused to the food product during a thermal fusing process.

7 Claims, 8 Drawing Sheets

ILLUSTRATION APPLICATOR FOR FOOD PRODUCTS

BACKGROUND—FIELD OF INVENTION

This invention relates to personalizing and or decorating food products.

BACKGROUND OF THE INVENTION

Traditionally, cakes carry messages. For the nature of hot foods, including pizza, was believed not adaptable for carrying congratulatory or decorative messages. Pizza has become a highly popular food item. Its popularity has spread to the use in festive occasions such as birthdays, anniversaries, holidays and other occasions. The present invention overcomes the problem of placing decorative congratulatory messages in a manner that is uniform and does not require relatively any more time than it takes to produce a food product such as a pizza pie.

Although products and methods have been developed to offer decorative messages, to shape dough and to cook food products such as pizza, none of these inventions are unique in the sense that they can offer a personalized decorative edible product in relatively the same amount of time it takes to produce a conventional food product. For instance, U.S. Pat. No. 4,605,579 to Michael Aremeno discloses a decorative heat retaining pizza cover. It is stated in the background of this patent that the nature of pizza does not render it adaptable for carrying congratulatory or decorative messages.

U.S. Pat. No. 5,243,899 to M. W. Moshier and associates discloses a method for uniformity of pizza tops assuring uniformity of pizzas made by different employees.

U.S. Pat. No. 4,159,349 to Caiello discloses a pizza and method that uses up to four geometrically congruent slices of pizza cheese having apertures. The slices are arranged to form one layer to cover the pizza shell.

U.S. Pat. No. 4,997,670 discloses a method for coating frozen cheese in a particulate free flowing condition. Modification of taste and functional properties of the cheeses is obtained by applying coatings to the outer sides of the cheese particles. The coatings can be applied so as to encapsulate the individual granules.

U.S. Pat. No. 4,832,973 to Ramserar discloses a process for producing characters or symbols on cheese and cheese products by discoloration with a thermal action. Basically it is a branding process.

U.S. Pat. No. 5,315,922 to Keller discloses a table top baking oven particularly for pizza or the like that provides both top and bottom heating of baked goods.

U.S. Pat. No. 5,789,009 to Kordic discloses methods that shape dough in a mold that will raise edges to make more crust. It is claimed that "fanciful or geometric arrangements" of raised crust with the toppings in between can be made. This seems quite time consuming getting the sauce, cheese and other toppings neatly in to the grooves of the "fanciful or geometric arrangements".

OBJECTS AND ADVANTAGES

Accordingly, the advantage of my invention is:
(a) it is simple to produce personalized hot food products;
(b) it is simple to produce decorative hot food products;
(c) it is simple produce a decorative personalized hot food product;
(d) to provide a colorful hot food
(e) it is easy to use
(f) different workers can produce the same, uniform product time and time again;
(g) to create the product in relatively the same amount of time it takes to produce a product without designs or being personalized;
(h) to provide amusement and enjoyment for the eater.

Still further objects and advantages will become apparent from a consideration of the ensuing description and drawings.

Figure 1:
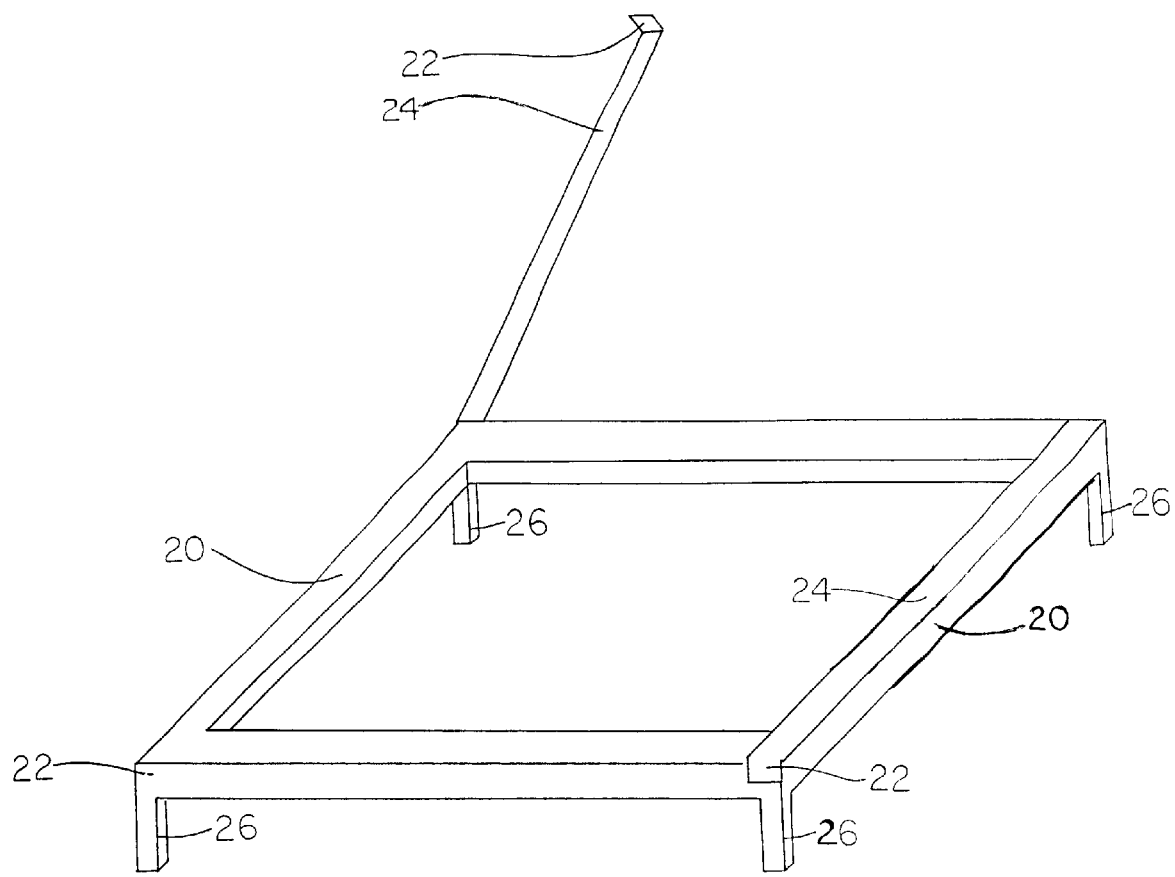
FIG. 1 is an isometric view of the housing frame of the illustration placement applicator with one clamp arm open the other closed.

| REFERENCE NUMBER IN DRAWINGS | | | |
|---|---|---|---|
| 20 | Housing frame | 22 | locking device |
| 24 | clamp arm | 26 | frames legs |
| 30 | applicator supports | 31 | push bars |
| 32 | bottom gate | 34 | center gate |
| 36 | top gate | 38 | lip |
| 40 | tension mechanism | 42 | stencil openings |
| 44 | depression | 46 | screen like grid |
| 48 | edible granules | 50 | edible powder |
| 60 | oven wall | 62 | handle |
| 64 | heat source | 66 | fan |
| 68 | fan motor | 70 | power cable |
| 80 | food product | 82 | edible symbol |
| 84 | edible decorations | 90 | jointed arm |

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENTS

In accordance with the present invention, a process for producing decorative personalized hot food products, FIG.

Figure 6:
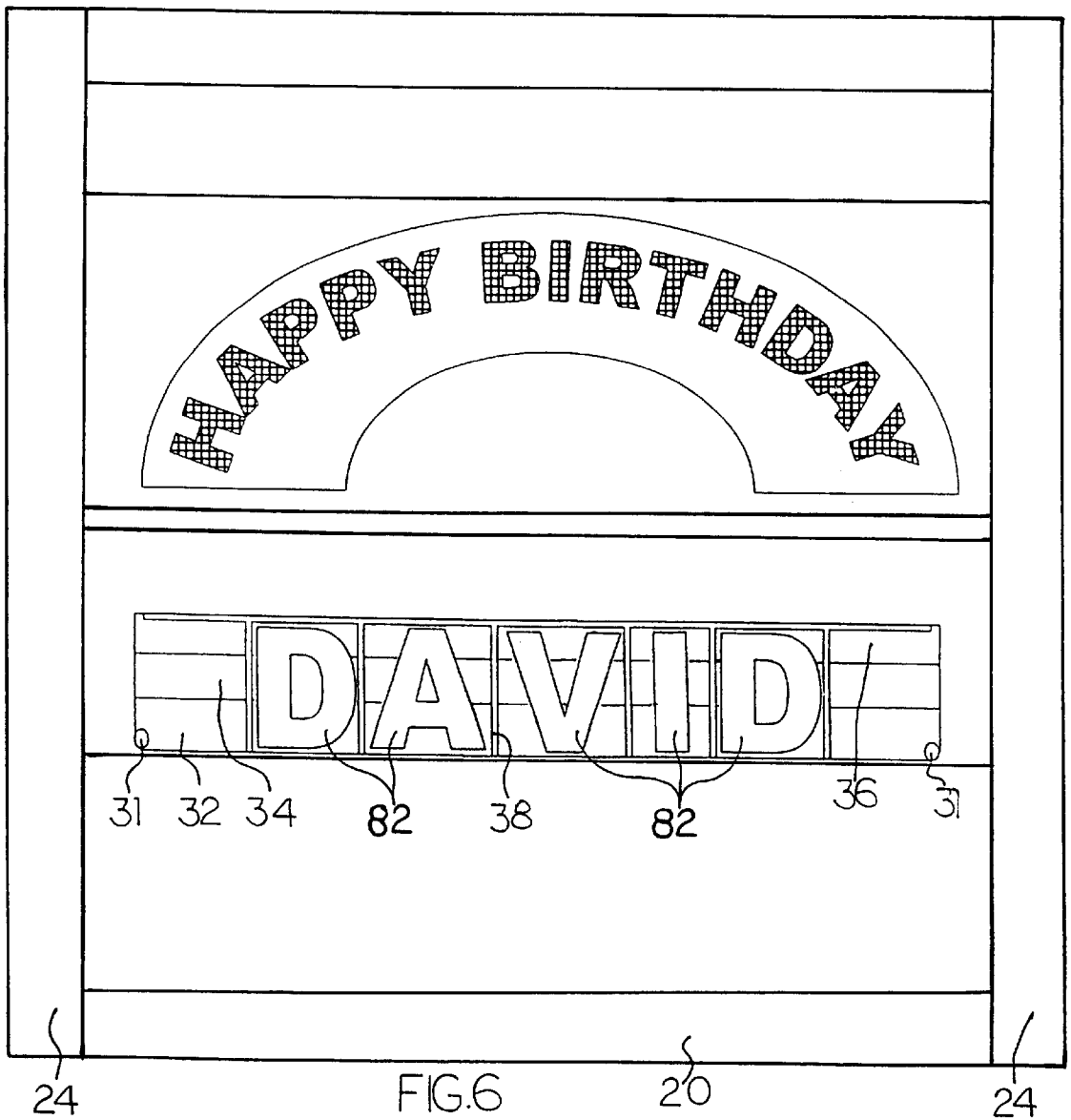
FIG. 6 is a top view of the housing frame with solid symbol and stencil symbol placement applicators in place with lettering on solid symbol placement applicator, gates closed.
Figure 7:
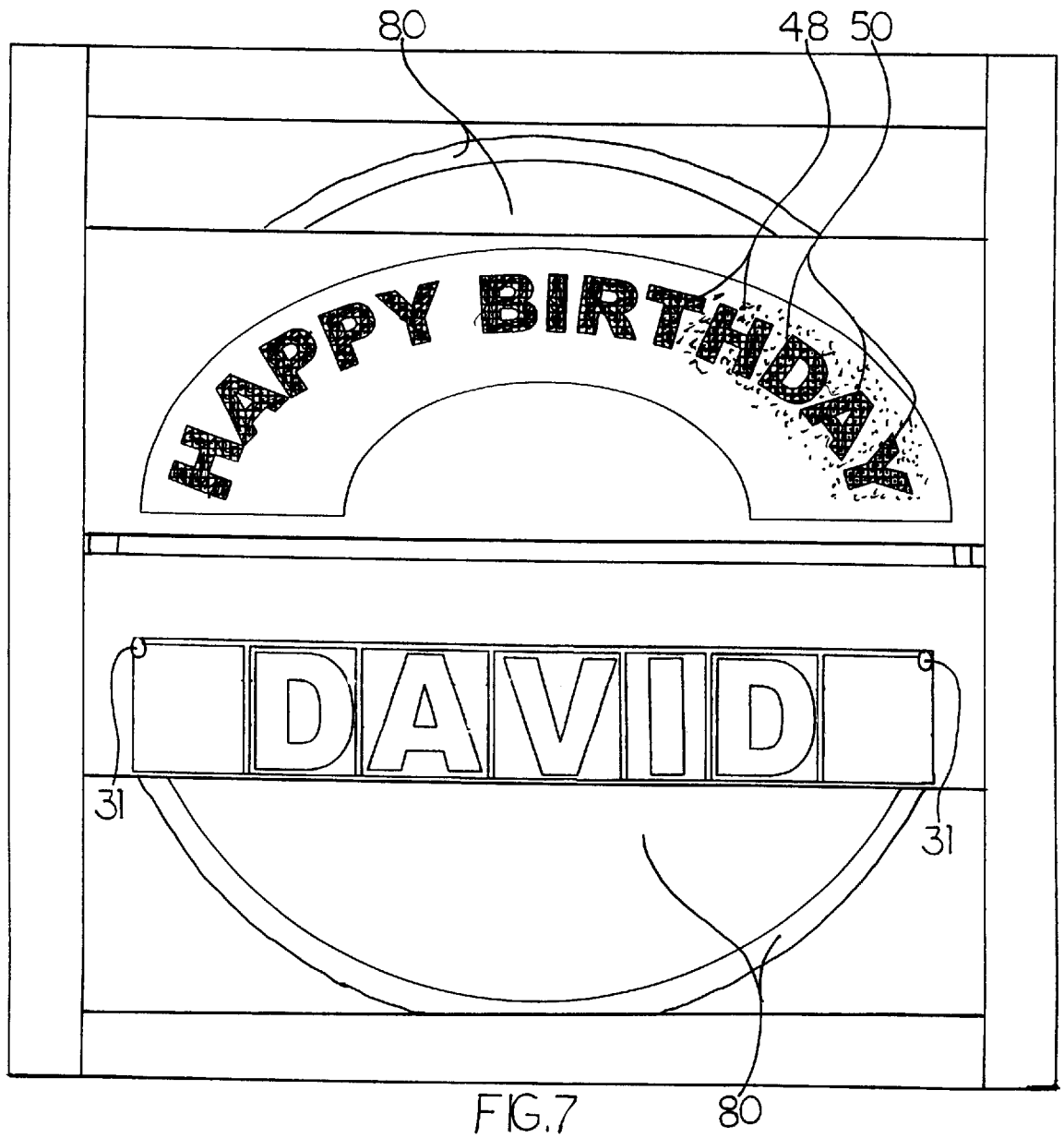
FIG. 7 is a top view of the housing frame with solid symbol and stencil stencil placement applicators in place with illustration applied to food product, solid symbol placement applicator, gates open.
Figure 8:
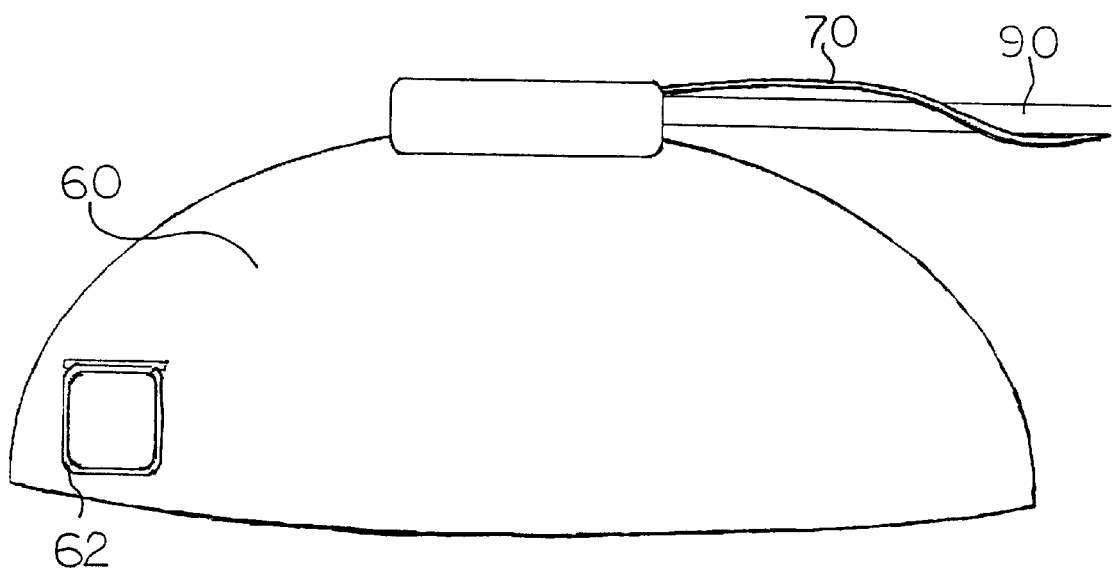
FIG. 8 is a side view of the special baking oven.
Figure 9:
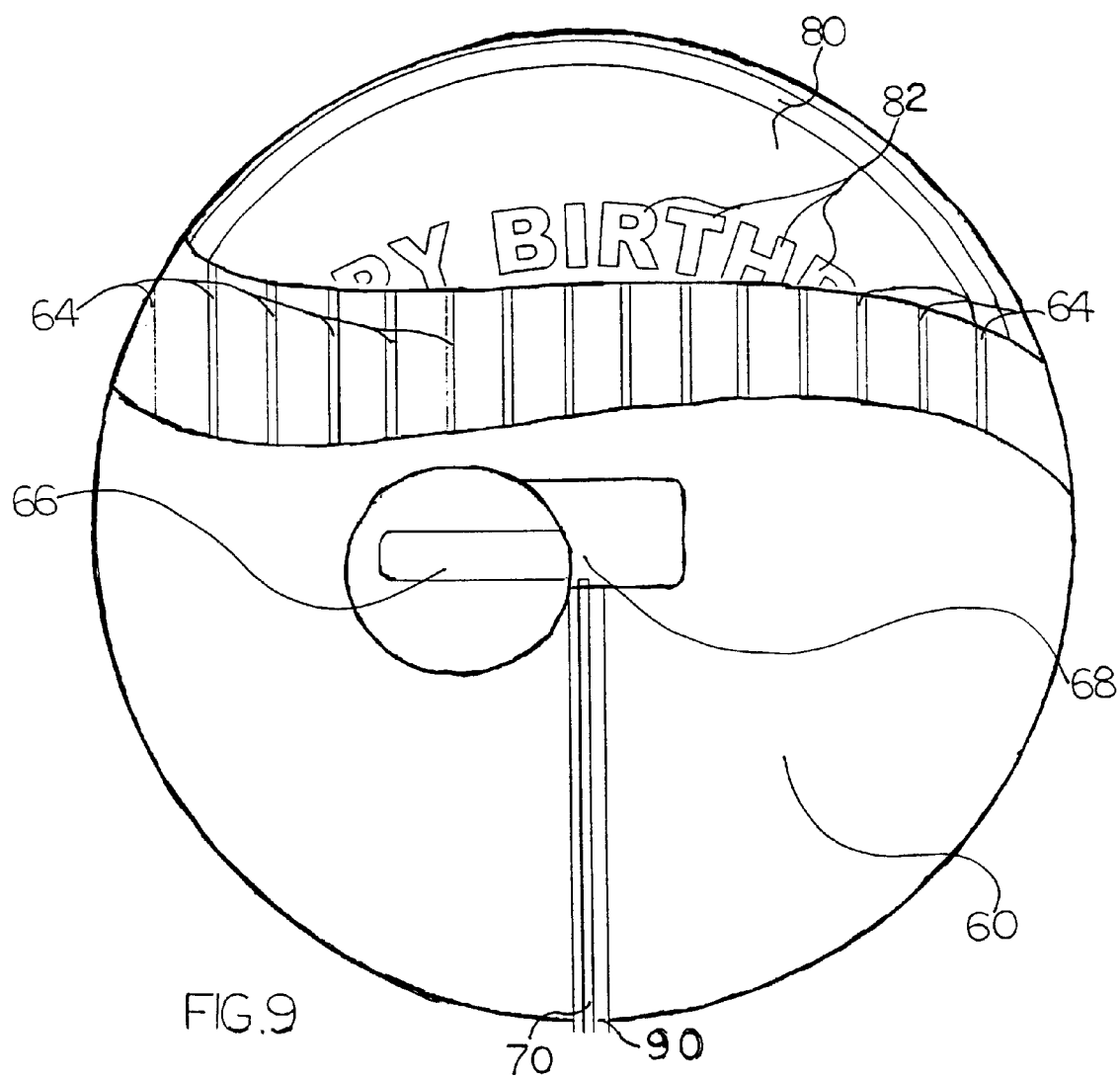
FIG. 9 is a cut away top view of the special baking oven with jointed arm attached over personalized food product.
Figure 10:
FIG. 10 is a top view of a personalized food product.

10, includes using illustration placement applicators (FIGS. 2, 3, 4, 6 and 7), which places symbols 82 and or decoration on the surface of a food product (FIGS. 7, 9 and 10). A special banking oven (FIGS. 8 and 9) may be used to complete the baking and fuse the design and or symbols to the food product. The fusion baking is done with the food product on the serving dish or in the delivery box so as not to disturb the symbols, numbers, lettering or designs before being fused to the food surface by a thermal process.

Referring FIGS. 1, through 10; there is shown a representative illustration of the invention described herein.

Figure 2:
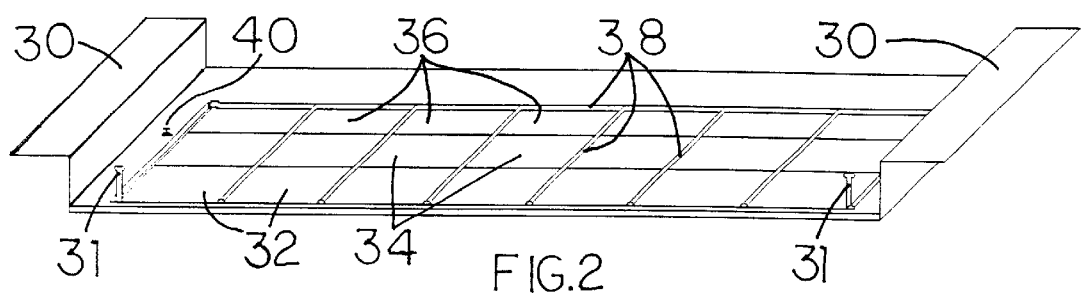
FIG. 2 is an isometric view of the solid symbol placement applicator with gates closed.
Figure 3:
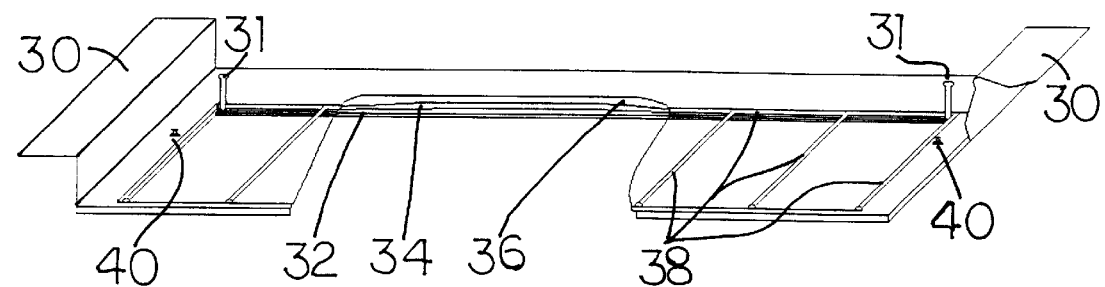
FIG. 3 is an isometric cut away view of the solid symbol placement applicator with gates open.
Figure 4:
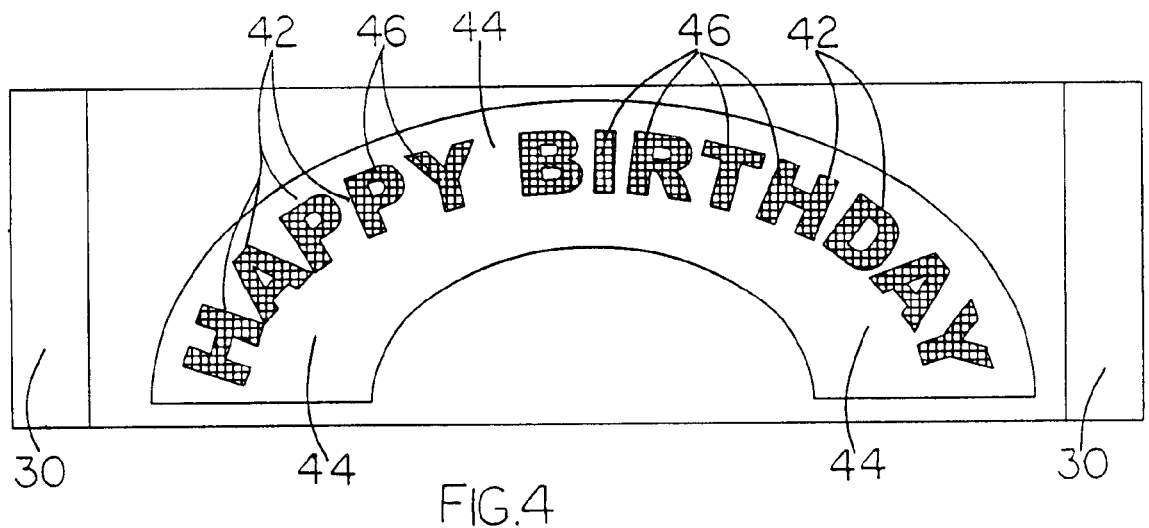
FIG. 4 is a top view of a stencil symbol placement applicator.

The pizza or other food product is prepared and cooking process begun. This may include any form or means of preparation and cooking. The invention incorporates a housing frame, FIG. 1, which has the purpose of holding and supporting the illustration placement applicator(s) by the applicators supports 30, FIGS. 2, 3,and 4 above the food surface, FIGS. 6 and 7. The frame may be attached to an arm with joints, 90, for easy mobility. The placement applicator(s) may be permanently attached to the housing frame. Or the placement applicator(s), FIGS. 2, 3 and 4, are placed over the frame, with the clamp arms 24 open, at the desired position. The clamp arms 24 are closed down on the placement applicator(s), holding the placement applicator(s) in place, FIG. 6. The clamp arms are secured in place by an arm locking mechanism 22.

The symbol placement applicator(s) is then ready to have the cheese or other edible symbols 82, placed on top of the drop gates 32, 34, 36 (FIG. 6). The pizza or food product is cooked with the top slightly under cooked. It is then placed on the serving tray or in the delivery box. The food product remains in this location until the fusion process is complete. The symbol placement applicator, supported by the frame, is positioned (approximately 0 to 1" inch) above the surface of the pizza or food product. The food surface is now ready to receive the symbols from the symbol placement applicator.

Gate(s) 32, 34, 36 (FIGS. 2, 3, 6 and 7) and lip 38 (FIGS. 2, 3, 6 and 7) of the solid symbol placement applicator has the purpose to minimize undesired movement of the solid symbol(s) as well as preventing the symbols from sticking to the gate(s) during application. The gates may be treated with an antistick coating. Minimized movement also may be aided by cold or frozen symbols. Opening of the gate(s) as described below accomplishes this.

Moving the push bars 31, which are attached to bottom gate 32, to the open position, opens the gates. Gate 32, the bottom gate, is the first gate to open. When the edge of gate 32 reaches gate 34, the middle gate, the push bars make contact with gate 34 so that the edges of gate 32 and gate 34 are aligned and moving together. When the edges of gate 32 and gate 34 reach the edge of gate 36, the top gate, the push bars make contact with gate 36 so that the edges of gates 32, 34 and 36 are aligned and moving together to the full open position. As few as none or as many gates needed should be used. A tension mechanism 40 may be used to keep pressure on the gates so as to keep the gates closed until the push bars make contact with the gate edge.

The stencil symbol placement applicator, FIGS. 4, 6 and 7, is placed in the housing frame in the same manner as the solid symbol placement applicator. It is aligned over the surface of the food product to receive the stencil. The stencil placement applicator may have depressions, 44, sloping towards the openings of the stencil, 42. The opening may also have a screen like grid, 46 that help the granules 48 or powder 50 to be distributed evenly across the food product surface.

Figure 5:
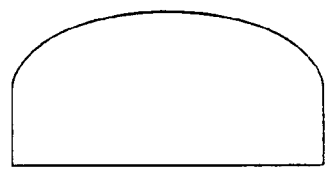
FIG. 5 is a side view granule, powder spreader.

A measured amount of cheese or other edible granule or powder is poured into the stencil symbol placement applicator and then evened out using a stencil granule, powder spreader FIG. 5. The stencil, granule spreader is pulled across the top of the stencil applicator in one direction and then back again if needed. The cheese or other food granules may be cold, frozen or coated to permit easy spreadability in the stencil symbol placement applicator. More than one stencil symbol placement applicator may be used to achieve the desired design or phrase and to make the design or phrase with more than one color or to achieve a layering effect.

A granule, powder funnel, not shown, may be used for easy application of different colors in tight areas. Funnels may be attached to housing frame or placement applicator. A predetermined amount of edible granules or powder is poured in to the opening of the funnel. The granules or powder is deposited on food surface. The shape of the end of funnel can be square, round; etc. to achieve a desired shape. Edible confection can also be applied to the food surface. Following the application of lettering, numbers, symbols and/or designs, the housing frame containing the symbol/stencil placement applicator(s) is moved away from the prepared food surface.

A thermal fusion process with the food product in the delivery container or on the serving tray is incorporated. This enables the fusion process to occur without the need to move the food product, which may cause disruption to the symbols, granules or powder. The temperature of the hot food product starts the thermal fusion process.

Additional temperature may be needed to complete fusion process. If so a special baking oven (FIGS. 8 and 9) is brought down over the prepared food product inclosing it. Turning the special baking oven on to the desired or preset temperature continues the fusion process that bonds the lettering, number(s), symbol(s), and/or design(s) to the food surface. The special baking oven may be attached to an arm with joints, 90, for easy mobility. The shape of the oven is to conform to the shape of the food product.

The oven wall 60 is fabricated of stainless steel or other suitable materials and may include an insulator liner, heat shields and the like are not shown but which are conventional in ovens. A heat source 64 preferably electric but may be a gas or other is used to achieve the desired temperature that the fusion process takes place. Baffles, which are not shown, may be used to distribute radiant heat if desired. A fan means 66, may be provided for impelling the heated air, to insure even temperature through out the oven. Both baffles and impelled heated air can aid to prevent undesired blistering or browning of cheese or food product during the thermal fusing process.

Functional modifiers may also be used to minimize blister formation, browning, as stabilizers or to aid in the thermal fusion process. Sodium citrate, dimethylpolysiloxane, hexametaphosphate, and trisodium phosphate formulations exhibit a modified melt characteristic. Additives including, surfactants, disodium phosphate, sodium citrate, silicone emulsifiers, and other GRAS-approved modifiers may be used to enhance flavors. A suitable defoamer is Union Carbide SAG 710 Food Grade, which is a silicone (dimethylpolysiloxane) emulsion The silicone antifoamers tend and to increase oiling off in the baking of pizzas from the coated cheese granules.

Once the fusion process is complete, the oven is moved up away from the finished food product. Being on the serving tray or in delivery container it is ready to be brought to its destination.

Although the invention has been described in its preferred form with a certain degree of particularity, it is understood that the present disclosure has been by way of example, and that numerous changes in the details of construction and the combination and arrangements of parts such as stencil over gates, etc, may be resorted to without departing from the spirit and scope of the invention as hereinafter claimed. It is intended that the patent shall cover, by suitable expression in the appended claims, whatever features of patentable novelty exists in the invention disclosed.

SUMMARY

Accordingly, the reader will see that the method of this invention allows the user to produce personalized decorative edible food products. This process does not require any additional skills than one would need involved in the steps to produce the food product other than simple recognition of letters and numbers. The method can produce a decorative food product in relatively the same time period it takes to produce a none decorative food product One application is for the method is to decorate, personalize and apply messages on pizza. The dough is formed in the usual manner by kneading, stretching, pressing rolling or use of machinery into the desired shape (round, square, rectangle, etc.) The conventional toppings are applied which usually include sauce and cheese. The pizza is put in the oven to bake. The symbol placement applicator is in the housing frame. The stencil placement applicator is in the same housing frame as the symbol placement applicator. While the pizza is cooking, precut symbols are placed on the symbol placement applicator. These can be the celebrants' name, for example "DAVID". The symbols can be colored. The stencil applicator will apply "HAPPY BIRTHDAY".

When the pie is cooked it is placed on a serving tray or in the delivery container. The housing frame is aligned over the pizza. This places the symbol placement applicator and stencil placement applicator directly above the pizza surface. The gates of the symbol placement applicator are opened. The precut symbols, "DAVID", are applied to the surface of the pizza. A predetermined amount of granules or powder is placed in the stencil placement applicator. These are spread out evenly using a granule, powder spreader. The granules or powder fill in the stencils "HAPPY BIRTHDAY" openings. The housing frame containing the symbol placement applicator and stencil placement applicator is moved up away from the pizza. On the surface of the pie remains the "HAPPY BIRTHDAY DAVID".

The fusion process is started by the temperature of the pizza. Functional cheese modifiers can further enhance the fusion process. Functional cheese modifiers can also stabilize the symbols, designs and the pizza surface. This will help prevent movement of such during delivery. Flavor additives may also be used as well as different food coloring.

To further aid in the fusion process a special baking oven may be used. This is a mobile oven. It is brought down over the decorated pizza that is on the serving tray or in the delivery container. The thermal action created by the oven continues to melt the cheese. Functional cheese modifiers can also be used to prevent undesired browning and blistering. When the fusion process is complete the special oven is moved up away from the finished pizza product. Whereby, the finished, decorated, personalized pizza product is ready to be brought to its destination to be enjoyed and eaten.

Although the description above contains only a few applications, these should not be construed as limiting the scope of the invention but as merely providing illustrations of some of the presently preferred embodiments of the invention. For example, personalizing and decorating pizza for birthday parties, good report cards, graduations, anniversaries or just for the fun of it. This opens numerous possibilities for application in the food service industry. From pizza to fruit pies to quiches the method of this invention will revolutionize the food industry, as it is know.

Thus the scope of this invention should be determined by the appended claims and their legal equivalents, rather than by the examples given.

What is claimed is:

1. A method of applying and joining decorative edible designs and or symbols, comprising alpha/numeric, wherein said symbols are applied and joined to the surface of a prepared food product, said method comprising steps of: applying an illustration which comprises a design and or symbols, wherein the illustration is applied by way of illustration applicators, wherein said illustration applicators are positioned in a housing frame for precise placement of said illustration on surface of said food product and implementing thermal fusion to join said illustration to said surface of said food product.

2. The method as in claim 1, wherein said illustration applicators include gate(s) that open to apply the illustration on surface of said food product.

3. The method as in claim 1, wherein said illustration applicators include stencil applicators to create designs by allowing granules or powder to enter into the openings of the stencils to allow the application of said granules or powder on to the food products surface.

4. The method as in claim 3, wherein said stencil applicators include a screen across the openings of the stencils to aid in even distribution of the granules or powder in the openings of the stencils.

5. The method as in claim 3, further including the step of a granule/powder spreader being drawn across the top of the stencil applicator, evening the granules or powder in the openings of the stencils.

6. The method as in claim 1, further including the step of applying illustration by way of pouring predetermined amount of edible granules or powder into a funnel opening, exiting shaped end of said funnel for precise placement of said edible granules or powder onto said food surface.

7. The method as in claim 1, further including the step of using a mobile oven to further execute the thermal fusion of illustration to food surface.

\* \* \* \* \*